Jan. 2, 1951    F. R. CHESTER    2,536,992
TRANSMISSION
Filed June 18, 1947    2 Sheets-Sheet 1

INVENTOR.
FRANK R. CHESTER
BY
William C. Hall
ATTORNEY.

Jan. 2, 1951  F. R. CHESTER  2,536,992
TRANSMISSION
Filed June 18, 1947  2 Sheets-Sheet 2

INVENTOR.
FRANK R. CHESTER
BY
ATTORNEY.

Patented Jan. 2, 1951

2,536,992

UNITED STATES PATENT OFFICE 2,536,992

TRANSMISSION

Frank R. Chester, Santa Monica, Calif.

Application June 18, 1947, Serial No. 755,313

6 Claims. (Cl. 74—772)

This invention relates to a transmission, and particularly to a variable speed transmission.

One of the principal objects of this invention is to provide a transmission for connecting small operating devices, such as fans, domestic mixers, and the like, to a drive means, such as an electric motor, whereby the operating devices may be rotated at various speeds.

Another important object of this invention is to provide a transmission whereby a relatively high speed or standard electric motor, which may be economically manufactured, may be employed for operating fans, mixers, or other operating devices, to rotate or operate at considerably lower speeds.

An important object also of this invention is to provide a transmission of this class whereby a fan, or other operating device, designed to operate at a relatively slow speed, may be connected to an electric motor designed to operate at a relatively high speed, so that a fan or other device may operate with less noise, wear, or the like.

A further important object of this invention is to provide a transmission of this class whereby a fan, or other operating device, may be substantially directly connected to the motor, or other drive means, in such a manner that the fan, or other device, and also the drive means, will not be materially injured if the rotation, or other operation of the device, is accidently or otherwise interfered with, or impeded, the transmission permitting the normal operation of the drive means in such a manner.

Still another important object of this invention is the provision of a transmission of this class which may be easily and quickly connected to the drive means.

A still further important object of this invention is the provision of a transmission whereby the driven or operating device may be rotated at various speeds, or whereby the same may be directly connected to the drive means.

An important feature of this invention is the provision of a transmission of this class which is relatively simple and economical of construction, durable, and which will not readily deteriorate or get out of order.

With these and other objects in view, as will appear hereinafter, I have devised a transmission having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Figure 1:
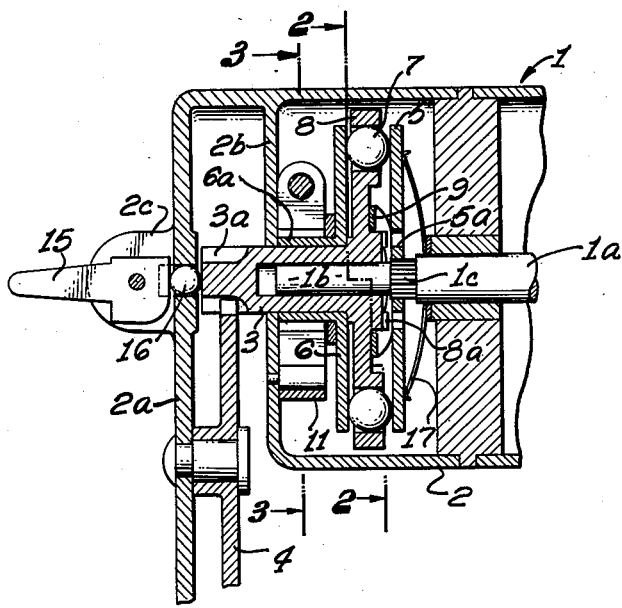
Fig. 1 is a fragmentary sectional view of my transmission, in one form of construction, connected to an electric motor.
Figure 2:
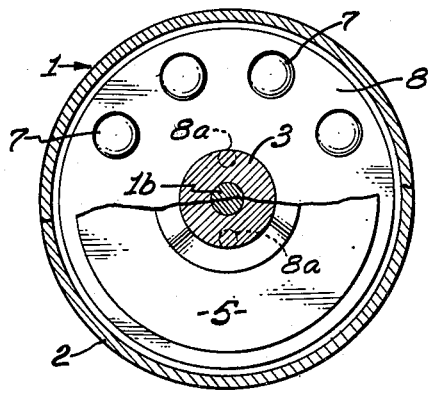
Fig. 2 is a sectional view thereof, taken through 2—2 of Fig. 1.
Figure 3:
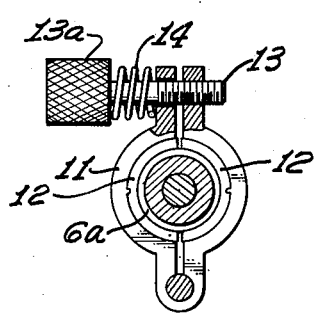
Fig. 3 is a transverse sectional view thereof, taken through 3—3 of Fig. 1, showing a friction brake means thereon.

My transmission is shown in the drawings as applied to an electric motor 1, which, for the purposes herein, may be referred to as a standard motor having a speed of 1750 R. P. M. This motor has a shaft $1^a$ having a reduced outer end $1^b$, and a fluted or splined portion $1^c$ at the inner end of the reduced portion. The motor has at one end a housing 2 which, in appearance, may be a part of the usual motor housing. My transmission is designed to be enclosed within the housing 2.

In the outer portion of the housing is a driven spindle 3, the outer end of which is shown as extending beyond the housing. Fig. 1 shows a gear $3^a$ at the outer end of the spindle, and this gear as meshing with a driven gear 4 journaled on an outer wall $2^a$ of the housing, this wall $2^a$ being positioned outwardly from the wall $2^b$ through which the spindle 3 extends and on which it is mounted.

Within the housing are mounted discs 5 and 6, these discs being concentric, the former being axially slidably mounted on the splined portion $1^c$ of the motor shaft, and the other disc being mounted around the spindle 3. Between the discs are mounted roller members 7, which in this instance are balls. These balls are held in position between the discs by means of a cage 8 provided at the inner end of the spindle 3. This cage is axially shiftable between the discs 5 and 6, but is urged toward the outer disc 6 by means of a spring 9.

On the inside of the outer wall or head $2^b$ of the housing 2 is pivotally mounted a clamp 11, which serves the purpose of a friction brake. The pivotal mounting of the clamp member or brake is located at one side of the axis of the motor. This brake carries a pair of shoes 12 which are located around and are adapted frictionally to embrace a hub 6ª extending outwardly from the outer disc 6. The brake or clamp member 11 is split, the split portion extending from the pivotal mounting thereof toward the opposite end of the member, permitting the opposite portions or furcations of the clamp member or brake to force the shoes 12 frictionally to engage the hub 6ª. The contraction of the furcations of the brake is effected at the free ends by means of a screw 13, a spring 14 being positioned around the screw and inwardly from the knob 13ª thereof for resiliently urging the free ends of the furcations of the brake together.

In its normal position, the brake 11 holds the outer disc 6 against rotation, allowing the shaft of the motor to rotate the cage 8 at one-half the speed of the motor, namely, at a speed of 875 R. P. M. As the knob 13ª of the screw 13 is drawn outwardly, releasing the tension of the spring 14, the hub 6ª of the outer disc 6 is allowed to rotate, increasing the speed of the spindle 3 proportionately until the spindle rotates at the motor speed.

In order to effect direct connection of the spindle 3 and the driven gear 4 to the motor shaft, the spindle 3 may be directly connected to the motor shaft through a positive clutch. This positive clutch is provided with lugs 8ª at the inner side of the cage 8, which lugs are arranged to enter recesses 5ª in the disc 5.

The positive clutch is actuated by the axial inward shifting of the spindle 3, this being caused by a cam lever 15 pivotally mounted on lugs 2ᶜ at the outer side of the wall 2ª of the housing 2, these lugs being positioned at the opposite sides of the axis of the spindle. Between the cam lever 15 and the end of the spindle 3 is provided a ball 16 for transmitting the movement of the cam lever to the spindle, this ball producing friction between the cam lever and the spindle. Inwardly from the inner disc 5 is provided a leaf spring 17, which here is shown as located around the shaft 1ª of the motor. This spring normally urges the disc 5 outwardly against the balls 7. Operation of the cam lever 15 causes the spindle 3 and cage 8 to be axially shifted inwardly and against the disc 5, allowing the balls 7 to be unseated from the disc 5, or to ride freely with the cage.

Figure 4:
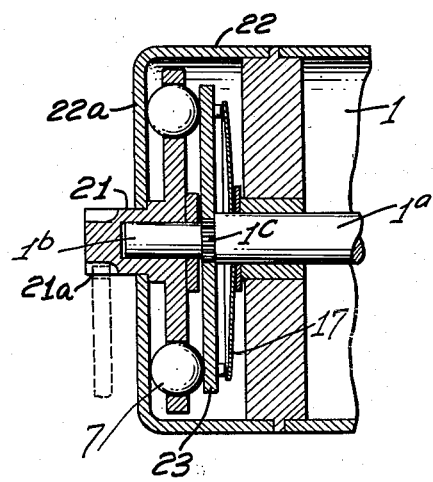
Fig. 4 is a fragmentary sectional view of my transmission, in a slightly modified form of construction, in which the adjustable feature is omitted; and, Fig. 5 is another fragmentary sectional view of my transmission, as referred to in connection with Fig. 4, but showing the same in a slightly modified form therefrom, and a transmission for connecting the fan-blade to an electric motor.

The construction shown in Fig. 4 omits both the frictional and the positive clutches, providing only a spindle 21 for carrying a fan, or other operating device, this spindle being shown as provided with a gear 21ª for connecting thereto the drive gear of a driven device, as suggested in connection with Fig. 1. In this construction, the outer disc is prevented at all times from rotating, and this disc or bearing surface is formed by the inner wall 22ª of the housing 22 provided at the outer end of the main motor housing. The inner disc 23 is arranged similarly to the disc 5 in the structure above described. In this instance, the spindle 21 is rotated at all times at half of the motor speed.

Figure 5:
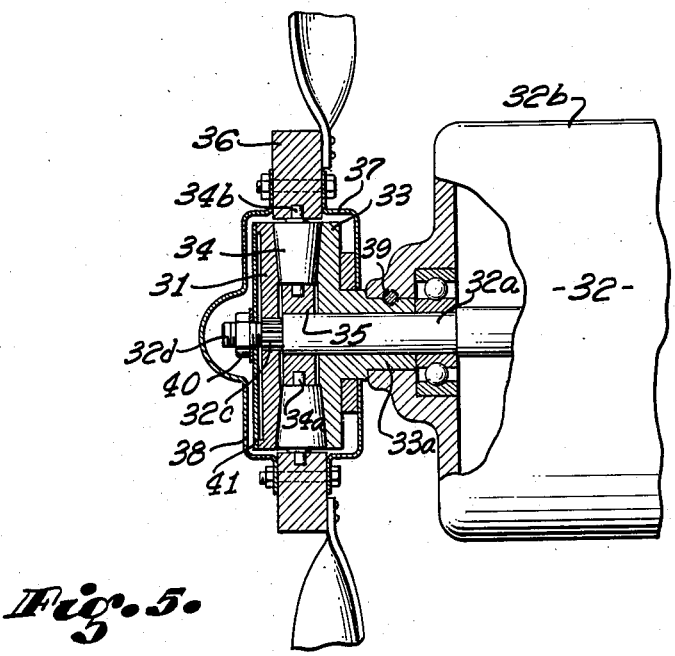

The structure shown in Fig. 5 is substantially the same as that shown in Fig. 4, in its operative construction. Here, however, the outer disc, designated 31, is directly connected to the outer end of the shaft 32ª of the motor 32, and the inner disc 33 is provided at and non-rotatably connected to the motor housing 32ᵇ. The roller members 34, in this instance, are shown as frusto-conical rollers having trunnions 34ª at their inner ends and 34ᵇ at their outer ends. The inner trunnions 34ª are rotatably mounted in a collar 35 mounted on the motor shaft, and the outer trunnions 34ᵇ are rotatably mounted in a cage in the form of a collar 36 which may carry the operating device, such as a fan.

The transmission mechanism is shown as enclosed by an inner casing plate 37 and an outer casing plate 38. These may be secured together at their outer ends through the collar or cage 36.

This structure is so arranged that the fan, or other operating device, may be easily connected to a conventional motor by inserting the hub 33ª of the inner disc into the bearing portion of the motor 32 and securing the same in place by means of a screw or other key 39. The outer disc 31 may be inserted over a splined portion 32ᶜ at the outer end of the motor shaft, and may be secured in place by means of a nut 40 to the outer threaded end 32ᵈ of the motor shaft 32ª. The discs 31 and 33 may be urged together against the rollers 34 by means of a spring disc 41 positioned between the nut 40 and the peripheral portion of the outer side of the disc 31.

I wish it to be understood that I do not desire to be limited to the exact details of construction shown and described, for obvious modifications will occur to a person skilled in the art.

I claim:

1. In a transmission, a housing, a splined drive shaft mounted therein, a pair of concentric opposed discs, one mounted on the shaft, an adjustable friction brake mounted on the housing for frictionally holding the other disc, rollers positioned between the discs, a cage enclosing the rollers and capable of being rotated thereby, said cage being provided with power take-off means, and resilient means mounted on the shaft urging the first disc toward the second disc to cause said rollers to bear upon both discs.

2. In a transmission, a housing, a drive shaft mounted therein and having a spline portion, a pair of concentric opposed discs, one mounted on the spline portion of the shaft, an adjustable friction brake mounted on the housing for frictionally holding the other disc, rollers positioned between the discs, a cage enclosing the rollers and capable of being rotated thereby, said cage being provided with power take-off means for varying the tension of the brake to allow varying rotation of the latter disc, and resilient means mounted on the shaft urging the first disc toward the second disc to cause said rollers to bear upon both discs.

3. In a transmission, a housing, a drive shaft mounted therein, a pair of concentric opposed discs, one mounted on the shaft, an adjustable friction brake mounted on the housing for frictionally holding the other disc, rollers positioned between the discs, a cage enclosing the rollers and capable of being rotated thereby, said cage being axially adjustable and provided with power take-off means, and a clutch for connecting the cage to the disc connected to the shaft.

4. In a transmission, a housing, a drive shaft mounted therein, a pair of concentric opposed discs, one mounted on the shaft, an adjustable friction brake mounted on the housing for frictionally holding the other disc, rollers positioned between the discs, a cage enclosing the rollers and capable of being rotated thereby, means on the housing for varying the tension of the brake to allow varying rotation of the latter disc, said cage being axially adjustable and provided with power take-off means, and a clutch for connecting the cage to the disc connected to the shaft.

5. In a transmission, a housing, a drive shaft mounted therein, a pair of concentric opposed discs, one mounted on the shaft, an adjustable friction brake mounted on the housing for frictionally holding the other disc, rollers positioned between the discs, a cage enclosing the rollers and capable of being rotated thereby, said cage being axially adjustable and provided with power take-off means, a clutch for connecting the cage to the disc connected to the shaft, and means on the housing and at the end of the shaft for actuating the second clutch.

6. In a transmission, a housing, a drive shaft mounted therein, a pair of concentric opposed discs, one mounted on the shaft, an adjustable friction brake mounted on the housing for frictionally holding the other disc, rollers positioned between the discs, a cage enclosing the rollers and capable of being rotated thereby, means on the housing for varying the tension of the brake to allow varying rotation of the latter disc, said cage being axially adjustable and provided with power take-off means, a clutch for connecting the cage to the disc connected to the shaft, and means on the housing and at the end of the shaft for actuating the clutch.

FRANK R. CHESTER.

REFERENCES CITED

The following references are of record in the file of this patent:

UNITED STATES PATENTS

| Number | Name | Date |
|---|---|---|
| 1,388,303 | Pulliam | Aug. 23, 1921 |
| 1,850,189 | Weiss | Mar. 22, 1932 |
| 2,383,107 | Cherry et al. | Aug. 21, 1945 |

FOREIGN PATENTS

| Number | Country | Date |
|---|---|---|
| 426,813 | Great Britain | Apr. 10, 1935 |